UNITED STATES PATENT OFFICE.

MARI E. WOLVEKAMP, OF OAKLAND, CALIFORNIA.

CHEMICAL COMPOUND.

1,412,440.　　Specification of Letters Patent.　Patented Apr. 11, 1922.

No Drawing.　　Application filed February 14, 1921. Serial No. 445,018.

*To all whom it may concern:*

Be it known that I, MARI E. WOLVEKAMP, a subject of the Queen of the Netherlands, and a resident of Oakland, in the county of Alameda and State of California, have invented certain new and useful Chemical Compounds, consisting in the organic mercury derivatives of aurin tricarboxylic acid and their alkali salts, of which the following is a specification.

The present invention relates to improvements in antiseptics and its object is to provide an antiseptic that will serve as a substitute for mercuric salicylate, and that may also be used as a disinfectant for medical or other instruments.

An advantage of my substitute over mercuric salicylate is that the former is very easily soluble in a sodium chloride solution.

It may be observed that when the three hydrogen atoms of methylalcohol are replaced by the three carbon atoms in paraposition to the hydroxyl groups of three molecules of mercuric salicylate (more accurately, anhydro-hydroxymercury salicylic acid), the anhydride of this product will be tri-mercuric aurin tricarboxylate or, more accurately, tri-anhydrohydroxymercury aurin tricarboxylic acid. This is a trimercurated derivative of the triphenylmethane dye (chrome violet) aurin tricarboxylic acid, and has about the same medicinal properties as mercuric salicylate.

If instead of three, only one or two atoms of mercury are introduced in aurin tricarboxylic acid, the free acid groups make these organic mercury compounds still more powerful antiseptics.

By boiling a mixture containing one grammolecule of aurin tricarboxylic acid, one grammolecule of mercuric oxide, 400 grams of sodium chloride in 10 liters of water for about three hours, after filtering off 1% in weight of an insoluble colored mercury compound, a yield of 99% calculated on mono-anhydrohydroxy mercury aurin tricarboxylic acid may be obtained, thus confirming in the formula the anhydro-nature of this compound.

The mercury atoms in these compounds are always in ortho-position to the hydroxyl groups and also connected with the carboxyl groups. They are ordinarily insoluble in water, but are 20% or more soluble if about two molecules of sodium chloride per mercury atom are present. They give the black mercuric sulphide reaction only after standing awhile, but with ferric chloride solution a strong violet color appears at once.

If a hydrochloric acid is added, the corresponding chloromercury derivatives of aurin tricarboxylic acid precipitate as very voluminous red masses. The di-sodium salt solutions of mono- and di-mercuric aurin tricarboxylate are deep cherry red, and the tri-sodium salt solution of tri-mercuric aurin tricarboxylate is somewhat more violet colored.

All these mercury compounds form hygroscopic purple powders with a metallic luster.

Having thus given the principal characteristics of my organic mercury derivatives of aurin tricarboxylic acid and their alkali salts, I will now proceed to give definite formulas for preparing the different compounds; dividing them in two classes, the first class to contain sodium chloride and the second class to be free of sodium chloride. Subdivisions in each class are defined by the quantity of mercury introduced.

1. Mono-mercuric aurin tricarboxylate I obtain by boiling a mixture of one grammolecule or 422 grams of aurin tricarboxylic acid, one grammolecule or 272 grams of mercuric chloride and two grammolecules or 168 grams of sodium bicarbonate for three hours in 10 liters of water. After filtering and evaporating to dryness at 100° C., the yield is 691 grams, containing 117 grams or 16.9% sodium chloride and 25.5% mercury. The yield is therefore 92.5% of one grammolecule of mono-mercuric aurin tricarboxylate containing 30.7% mercury.

2. Di-mercuric aurin tricarboxylate I prepare by boiling a mixture of one grammolecule of aurin tricarboxylic acid, two grammolecules of mercuric chloride and four grammolecules of sodium bicarbonate. In this case the yield is 897 grams, containing 26.1% sodium chloride and 80.9% of one grammolecule of di-mercuric aurin tricarboxylate, containing 47.6% mercury.

3. Tri-mercuric aurin tricarboxylate I prepare by similarly boiling a mixture of one grammolecule of aurin tricarboxylic acid, three grammolecules of mercuric chloride and six grammolecules of sodium bicarbonate. The yield I thus obtain is 1210 grams, containing 29% sodium chloride and 84.4% of one grammolecule of tri-mercuric aurin tricarboxylate, containing 59.3% mercury.

The three mercury compounds without sodium chloride I obtain as follows:

1. Di-sodium salt of mono-mercuric aurin tricarboxylate I obtain by boiling a mixture of one grammolecule of aurin tricarboxylic acid, two grammolecules of sodium bicarbonate and one grammolecule of mercuric oxide in 10 liters of water for about three hours, separating the mercury through a filter, and acidifying the solution with sulphuric acid. I thus obtain 541 grams or 87.1% of one grammolecule of mono-mercuric aurin tricarboxylate, containing 30% mercury.

2. Di-sodium salt of di-mercuric aurin tricarboxylate I obtain by similarly boiling a mixture of one grammolecule of aurin tricarboxylic acid, two grammolecules of sodium bicarbonate and three grammolecules of mercuric oxide in 10 liters of water and acidifying and filtering as before. The yield in this case is 665 grams or 81.2% of one grammolecule of di-mercuric aurin tricarboxylate, containing 44.9% mercury.

3. Tri-sodium salt of tri-mercuric aurin tricarboxylate I obtain by similarly boiling a mixture of one grammolecule of aurin tricarboxylic acid, three grammolecules of sodium bicarbonate and four grammolecules of mercuric oxide in 10 liters of water and proceeding as before. The yield in this case is 771 grams or 75.7% of one grammolecule of tri-mercuric aurin tricarboxylate, containing 52.9% mercury.

I claim:

1. The organic mercury derivatives of aurin tricarboxylic acid.

2. The alkali salts of the organic mercury derivatives of aurin tricarboxylic acid.

3. Mono-mercuric aurin tricarboxylate.

4. The di-sodium salt of mono-mercuric aurin tricarboxylate.

MARI E. WOLVEKAMP.